(No Model.)
C. L. PETERSEN.
APPARATUS FOR EXPRESSING, STRAINING, AND PURIFYING LIQUIDS.
No. 577,448. Patented Feb. 23, 1897.
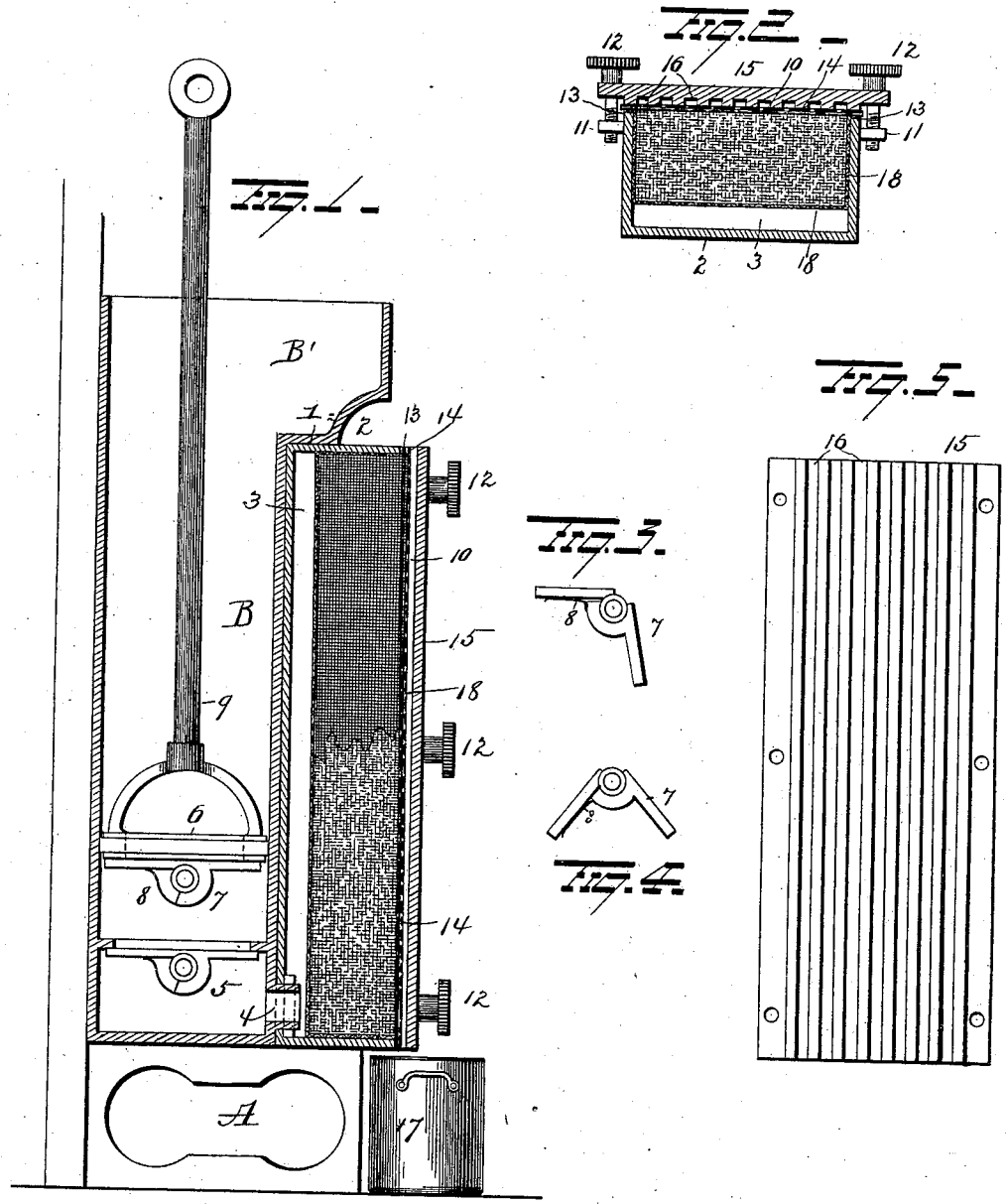

UNITED STATES PATENT OFFICE.

CHRISTIAN LUDVIG PETERSEN, OF REVERE, MASSACHUSETTS.

APPARATUS FOR EXPRESSING, STRAINING, AND PURIFYING LIQUIDS.

SPECIFICATION forming part of Letters Patent No. 577,448, dated February 23, 1897.

Application filed April 13, 1896. Serial No. 587,322. (No model.)

*To all whom it may concern:*

Be it known that I, CHRISTIAN LUDVIG PETERSEN, of Revere, in the county of Suffolk and State of Massachusetts, have invented certain new and useful Improvements in Apparatus for Expressing, Straining, and Purifying Liquids; and I do hereby declare the following to be a full, clear, and exact description of the invention, such as will enable others skilled in the art to which it appertains to make and use the same.

My invention relates to an improvement in apparatus for expressing, straining, and purifying fluids, such as juices of fruits, &c., the object of the invention being to provide simple and efficient apparatus by means of which juices can be effectually and completely expressed from fruit, &c., so as to leave nothing but the stones or seed, skin, and fiber, and to strain or filter juice or other fluid to any desired degree.

With this object in view the invention consists in certain novel features of construction and combinations and arrangements of parts, as hereinafter set forth, and pointed out in the claims.

In the accompanying drawings, Figure 1 is a vertical cross-section of an apparatus embodying my improvements. Fig. 2 is a horizontal cross-section. Figs. 3 and 4 are views showing the positions of the valves when acted upon by uneven pressure, such as occurs when pumping dry stuffs or fruit. Fig. 5 is a detail view of the corrugated plate.

A represents a suitable base, on which the cylinder B of a force-pump is located, said cylinder being preferably provided at its upper end with enlarged portion or mouth B', constructed to form a shoulder 1. A receptacle 2 is secured to the pump-cylinder and disposed between the shoulder 1 and the base A, and the chamber 3, formed by said receptacle, communicates at its lower end with the lower end of the pump-cylinder by means of a short pipe 4. A valve 5, adapted to open downwardly, is located within the pump-cylinder just above the pipe 4, and the plunger 6 in said pump-cylinder is also provided with a downwardly-opening valve 7. The valves 5 and 7 are provided with springs 8 of just sufficient strength to cause them to close. The rod 9, which carries the plunger, will have suitable means connected with it for operating the said plunger.

The receptacle 2 is made with a mouth 10, and near said mouth the receptacle is provided with flanges 11, having screw-threaded perforations for the reception of screws 12. A frame 13, carrying a wire screen or other straining or filtering material 14, is adapted to normally close the mouth 10, and against this frame a plate 15 is placed, said frame and plate being secured in position by means of screws 12, which enter the screw-threaded perforations in the flanges 11. The plate 15 is corrugated or made with vertical grooves 16, adapted to receive juice or liquid forced through the screen or filter and conduct it to a bucket or other receptacle 17.

The fruit or liquid to be acted upon is fed into the pump-cylinder through the enlarged upper end or mouth thereof, and as the plunger is made to rise and fall the fruit or liquid will find its way through the valved plunger and by it be forced through the valve 5 and the short pipe 4 into the receptacle 2. As the pump continues to operate, the fruit or liquid will continue to pass into the receptacle 2 and be subjected to sufficient pressure to force the juice from the fruit (or the liquid, if liquid only is being treated) through the meshes of the screening, straining, or filtering material which closes the mouth of said receptacle 2, the juice or liquid thus forced out entering the grooves or channels in the plate 15 and running through them to a suitable receptacle 17 below.

It will be observed that when the pump-plunger is operated the fruit will be crowded into the receptacle 2 and a pressure of fruit against fruit will be exerted to express the juice, which latter will escape in the manner above explained. When fruit or dry stuffs is being treated, the operation of the pump will continue until nothing is left in the receptacle 2 but the seed or stones, skin, and fiber. In other words, the machine will "pump itself dry." When fluid is being treated for straining and purifying it, the pressure exerted to force the fluid through the straining material will be a pressure of fluid against fluid. When such fruit as peaches is being operated upon, I prefer to employ a very fine wire screen 14, but for wines, liquors, &c., I prefer to use, in addition to the wire screen, a number of thicknesses of cloth, felt, porous paper, or similar material.

When the apparatus is used for filtering wines or other liquids, it may be found desirable to insert within the chamber 3 of receptacle 2 a loose receptacle 18 for containing filtering material, such an charcoal, pumice-stone, asbestos, or other filtering material. The walls (front and back) of the receptacle 18 will be composed of perforated metal and may be covered with cloth, felt, flannel, or other similar material.

My improved apparatus may be operated successfully by manually-applied power, but can be driven by machinery, in which latter case it will be found desirable to provide a two-part pitman having interposed yielding devices to prevent undue strain when the receptacle 2 becomes filled with refuse.

My improvements are simple in construction and effectual in all respects in the performance of their functions.

Various slight changes might be made in the details of construction of my invention without departing from the spirit thereof or limiting its scope, and hence I do not wish to limit myself to the precise details of construction herein set forth; but, Having fully described my invention, what I claim as new, and desire to secure by Letters Patent, is—

1. The combination with a cylinder and a valve near its lower end, of a valved plunger in said cylinder, a receptacle communicating with said cylinder below the valve therein and having an open mouth, and straining or filtering material closing said mouth, substantially as set forth.

2. The combination with a cylinder and a downwardly-opening valve near the lower end thereof, of a plunger in said cylinder, a downwardly-opening valve in said plunger, a receptacle communicating with said cylinder below the valve therein, said receptacle having an open mouth and straining or filtering material closing said mouth, substantially as set forth.

3. The combination with a base, and a pump-cylinder located on said base and a shoulder at the upper end of said pump-cylinder, of a receptacle disposed between said base and said shoulder, a downwardly-opening valve in the lower portion of the pump-cylinder, a pipe connecting said pump-cylinder with said receptacle at a point below the valve, a valved plunger in said cylinder and a screen or strainer secured to the mouth of said receptacle, substantially as set forth.

In testimony whereof I have signed this specification in the presence of two subscribing witnesses.

CHRISTIAN LUDVIG PETERSEN.

Witnesses:
WILLIAM DAILEY,
FREDERICK A. GREENE.